Aug. 2, 1966    M. GALE    3,264,646
PASSIVE PERIMETER INTRUSION DETECTION SYSTEM
Filed Dec. 18, 1963

INVENTOR.
MANFRED GALE
BY *Joseph A. Hill*
ATTORNEY

United States Patent Office 3,264,646
Patented August 2, 1966

3,264,646
PASSIVE PERIMETER INTRUSION
DETECTION SYSTEM
Manfred Gale, 7405 Kelvin Place, Springfield, Va.
Filed Dec. 18, 1963, Ser. No. 331,631
4 Claims. (Cl. 343—100)

The invention described herein may be manufactured and used by or for the Government for governmental purposes without the payment to me of any royalty thereon.

This invention relates to an intrusion detecting system.

More specifically this invention relates to a perimeter intrusion detection system utilizing natural thermal radiation.

Intrusion detection systems presently known include electromagnetic radiation or thermal radiation generating means which interfere with other equipment in the vicinity, employ movable elements which require maintenance, generally are complex equipments, may be compromised, are sensitive to effects created by man-made sources and are not selective to permit excluding detection of selected objects.

The primary object of the present invention is to provide a system capable of detecting the crossing or intrusion over a path by personnel, vehicles, or other objects.

A further object of the present invention is to provide such a perimeter intrusion detection system which functions without the necessity of emitting radiation itself but relies solely on natural thermal radiation and is therefore a passive system.

Yet another object of the present invention is to provide a perimeter intrusion detection system which causes no interference with other electronic equipment operating in the vicinity and is substantially insensitive to foiling attempts on the part of the intruder.

Figure 1:
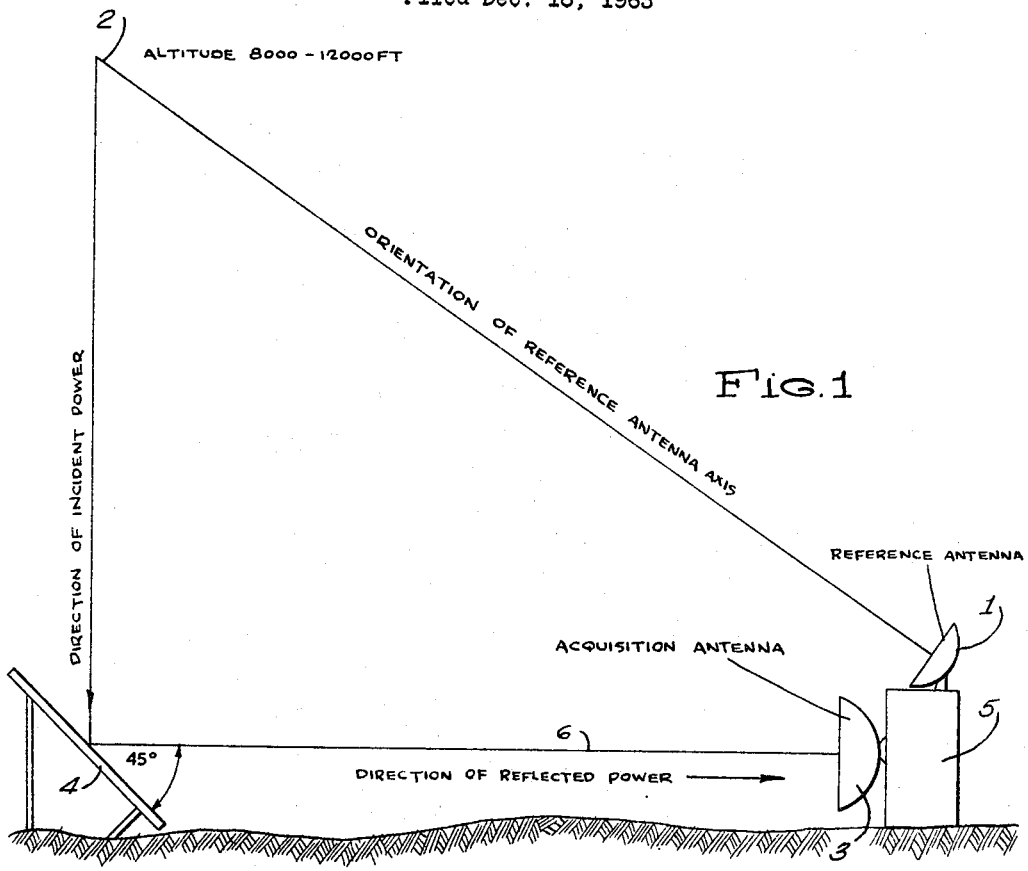
Figure 2:
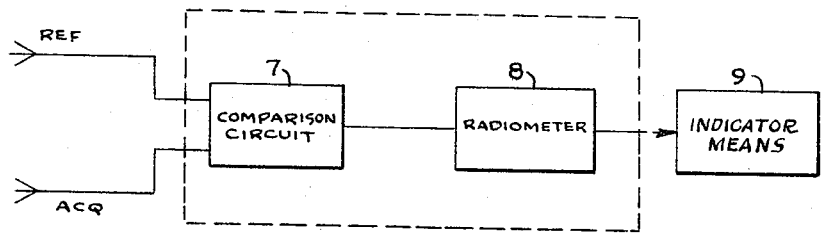

These and other objects of this invention will be apparent from the following disclosure taken together with the accompanying drawing, in which:

FIG. 1 is a schematic diagram representing the components of the intrusion detection system assembled to detect crossing of a path by an intruder; and FIG. 2 is a block diagram representing the basic components of the electrical circuitry required.

Broadly, my invention comprises a passive perimeter intrusion detection system which consists of an acquisition antenna, the axis of which is directed along the perimeter towards a reflecting surface, oriented to reflect thermal radiation from a point in the sky towards the acquisition antenna; a reference antenna directed at the same point in the sky; a comparison circuit which receives the outputs of the acquisition and reference antennae and which determines the difference between the outputs of the two antennae; and a radiometer which measures the value of this difference and operates an alarm or other appropriate instrument when the magnitude of the difference exceeds a certain limit.

The reflecting surface is adjusted at a proper angle and the system is arranged so that the point in the sky from which the radiation is reflected by the reflecting surface is the same point in the sky from which the reference antenna collects radiation.

The amount of radiation striking the reference antenna, which is directed towards the sky, will be approximately the same as the amount of radiation striking the acquisition antenna directed towards the reflecting surface. The difference between the two amounts of radiation will continue to be constant and will not vary even when meteorological conditions vary.

As an object or person enters the perimeter and comes between the reflecting surface and the acquisition antenna, the normal reflected microwave radiation will be absorbed or scattered and the acquisition antenna will receive a lesser amount of reflected radiation. The amount of radiation received at the reference antenna will continue to be relatively constant. Thus, there will be an amplitude differential between the signals of the two antennae which is detectable by the comparison circuit. This differential will be measured by the radiometer and may be used to set off an appropriate indicator means or operate another instrument.

Referring now to FIG. 1, there is shown a diagram of the perimeter intrusion detecting system. One of the source antennae is denoted as a reference antenna 1 which is directed at a point 2 in the sky. The other source antenna is referred to as an acquisition antenna 3 and is mounted to receive radiation reflected from the reflecting surface 4. The reflecting surface is mounted at a proper angle (in the arrangement shown in the diagram the proper angle is 45°) to reflect radiation from the same point 2 in the sky at which the reference antenna 1 is directed. The outputs of the reference antenna 1 and the acquisition antenna 3 are fed through a radiometer into a suitable comparison circuit housed in box 5.

Referring now to FIG. 2, the outputs of the reference antenna 1 and the acquisition antenna 3 are fed through an amplitude comparison circuit 7. The amplitude comparison circuit operates to pass on only the difference between the amount of signal received from the reference antenna 1 and acquisition antenna 2. This differential value is fed through a radiometer 8 which is adjusted to operate an alarm or other appropriate device 9 when the differential value exceeds a predetermined level. The comparison circuit and radiometer may be housed together in box 5.

The reflecting surface 4 is constructed with a highly reflective surface such as polished aluminum. It is positioned at one end of the perimeter link so that radiation from the point 2 in the sky will be reflected along the axis 6 of the acquisition antenna 3. The reference antenna 1 is oriented to receive radiation from the point 2 in the sky directly. It has been found in practice that selection of a point 2 in the sky at between 8,000 and 12,000 feet is most efficient.

This invention may be applied to utilizing radiations throughout the thermal spectrum. Although thermal effects are most often measured at infrared frequencies, microwave frequencies are considered more suitable for the application of this invention because of their considerably enhanced transmission properties despite variations of conditions due to changes in season, weather, and vegetation.

The operating frequency for the radiometer 8 is chosen so that atmospheric attenuation and scattering is minimized while at the same time antennae with reasonable directivities can be kept within sizes not exceeding 2 feet in maximum dimension. A frequency of about 30 kmc. is a reasonable compromise; however, it may happen that applications in specific environments dictate other choices.

The radiometer 8 should be of the type utilizing a superheterodyne receiver with a temperature resolution capability of approximately 3° Kelvin for an integration time of 50 milliseconds.

The device may be assembled to detect intrusion across a link of a perimeter or across a path. The diagram of FIG. 1 reveals the axis 6 of the acquisition antenna directed along a line an intrusion of which is to be detected.

When the device is placed in normal operation, the radiometer 8 will always register a "very cold" signal since the sky temperature may vary from a few degrees Kelvin to 150° K. As an intruding object crosses the path 6 between the acquisition antenna 3 and the reflecting surface 4, the object absorbs or scatters much of the energy which is normally received by the acquisition antenna 3. The intruding object also causes some emission at a high temperature of about 300° K. This sudden interruption of the path 6 of reflected energy causes an equally sudden increase in the apparent temperature differential registered by the radiometer 8. This increase in differential detected by the radiometer 8, will actuate an alarm or other appropriate indicator means 9.

This system has many useful applications including detection of intrusion into secured areas, detection of vehicles passing a point on a road, and detection of radar-camouflaged ships entering an area. I have here illustrated my invention in a specific form, but it will be obvious that many variations may be made therein without departing from the spirit of the invention as defined in the following claims.

I claim:

1. A passive intrusion detection system activated by natural thermal radiation comprising:
    (a) an acquisition antenna the axis of which is directed along a predetermined path;
    (b) a reference antenna directed toward a selected point in the atmosphere;
    (c) a wave energy reflecting surface disposed in said predetermined path opposite said acquisition antenna and oriented to reflect radiation from said selected point in the atmosphere along said axis of the acquisition antenna to the acquisition antenna; and
    (d) means connecting said reference antenna and said acquisition antenna to an electrical signal amplitude responsive comparison circuit.

2. A passive intrusion detection system responsive to natural thermal radiation in the microwave region comprising:
    (a) a microwave antenna adapted to receive microwave radiation directed along a first path;
    (b) a microwave antenna adapted to receive microwave radiation directed along a second path;
    (c) a microwave energy reflecting means disposed for coaction with said antenna in said first path to receive microwave radiation from a selected point in said first path and reflect such radiation to said antenna in said second path;
    (d) said antenna in said first path and said antenna in said second path connected to amplitude responsive means for comparison of the amplitude of wave energies received along said first and second paths; and
    (e) indicator means connected to said means for comparison for displaying differences in energy levels received along said first and second paths.

3. A passive intrusion detection system responsive to natural thermal radiation in the microwave region comprising:
    (a) a first stationary antenna adapted to receive microwave energy and disposed to intercept microwave energy directed along a predetermined path;
    (b) a second stationary antenna adapted to receive microwave energy and disposed to receive ambient microwave energy from the atmosphere;
    (c) a reflector for microwave energy disposed to intercept ambient microwave energy from the atmosphere and to reflect received ambient microwave energy along said predetermined path toward said first stationary antenna;
    (d) said first and second stationary antennae connected to means including amplitude responsive circuit means for comparison of energy received along said predetermined path and atmospheric ambient energy; and
    (e) indicator means connected to said circuit means for displaying differences in atmospheric ambient microwave energy and microwave energy received along said predetermined path.

4. A passive intrusion detection system responsive to natural thermal radiation in the microwave region as claimed in claim 3 wherein said first and second stationary antennae include parabolic reflectors and said reflector has a planar reflecting surface.

References Cited by the Examiner

UNITED STATES PATENTS

| 2,649,538 | 8/1953 | Marlowe et al. | 343—100 |
| 2,660,718 | 11/1953 | Summerhayes et al. | 340—258 |
| 3,171,126 | 2/1965 | Wiley | 343—112 |

CHESTER L. JUSTUS, *Primary Examiner.*

LEWIS H. MYERS, *Examiner.*

R. E. BERGER, *Assistant Examiner.*